United States Patent [19]
Bruner et al.

[11] Patent Number: 6,040,976
[45] Date of Patent: Mar. 21, 2000

[54] SWITCHGEAR CONDUCTORS AND MOUNTING ARRANGEMENTS THEREFOR

[75] Inventors: Rodney William Bruner; William Edward Wilkie, II, both of Fletcher, N.C.

[73] Assignee: Eaton Corporation, Cleveland, Ohio

[21] Appl. No.: 09/188,721

[22] Filed: Nov. 9, 1998

[51] Int. Cl.[7] ...................................................... H02B 1/20
[52] U.S. Cl. .................. 361/611; 174/71 B; 174/129 B; 361/638; 361/649; 439/212
[58] Field of Search ................. 174/68.2, 70 B, 174/71 B, 72 B, 88 B, 99 B, 129 B, 133 B; 361/611, 614, 624, 637–638, 639, 648–649, 650; 439/114, 212–214

[56] References Cited

U.S. PATENT DOCUMENTS

| | | | |
|---|---|---|---|
| 1,915,918 | 6/1933 | Bostwick | 174/129 B |
| 3,786,313 | 1/1974 | Coles et al. | 361/644 |
| 3,793,564 | 2/1974 | Salvati et al. | 361/614 |
| 5,157,584 | 10/1992 | Rowe | 361/638 |

*Primary Examiner*—Gregory Thompson
*Attorney, Agent, or Firm*—Martin J. Moran

[57] ABSTRACT

Hollow risers in switchgear are preferably formed by a confronting pair of spaced apart U-channels. Stab conductors for connecting switching apparatus in the switchgear to the risers have a pair of flat members straddling and secured to the two U-channels by mounts which include backing plates bearing against the inner surfaces of the confronting legs of two U-channels and bolts extending through the stab conductors and U-channel legs and engaging threaded apertures in the backing plates. To accommodate a range of current ratings, the confronting channels can have first and second leg thicknesses $t_1$ and $t_2$, which can be different but the outer widths of the channels are all the same. The backing plates have a first surface with a third thickness in one section and a fourth thickness in a second section. This first surface bears against the U-channel legs when the legs are of different thicknesses and $t_1$ plus $t_3$ is made equal to $t_2$ plus $t_4$. The second face of each backing plate is planar and bears against the inner surface of the legs of the U-channels when $t_1$ is equal to $t_2$.

16 Claims, 8 Drawing Sheets

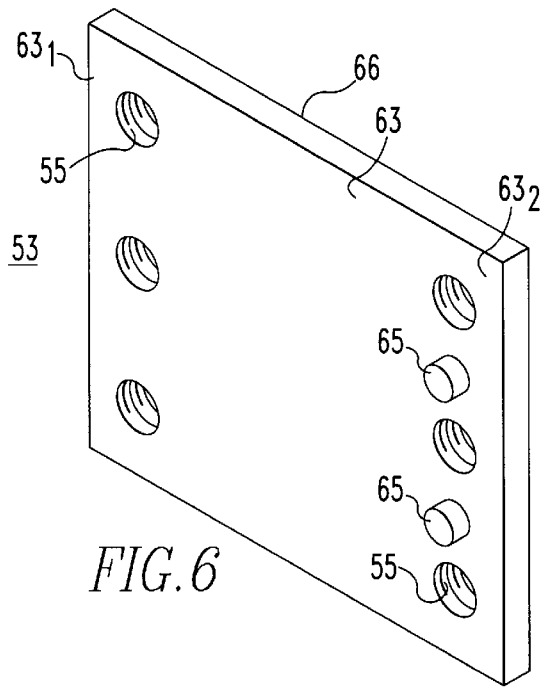
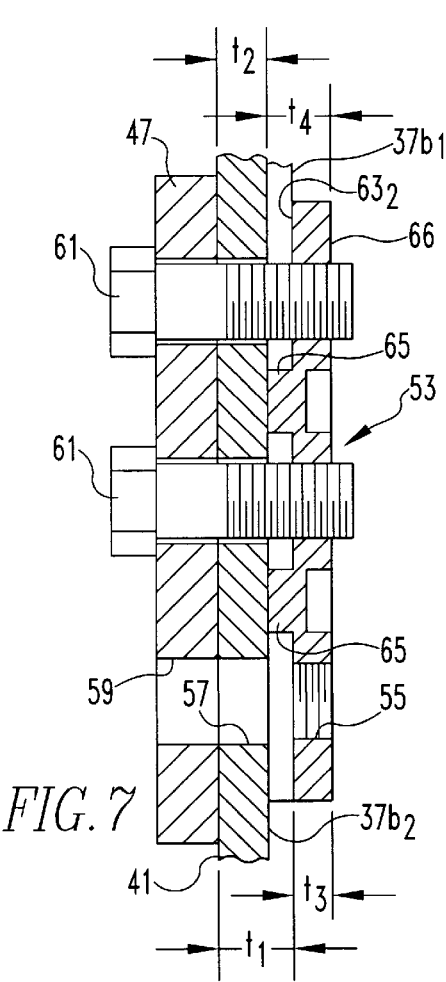
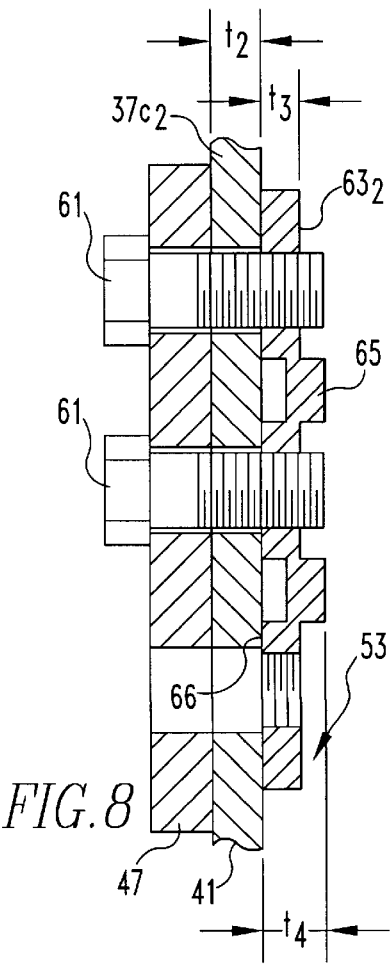

6,040,976

SWITCHGEAR CONDUCTORS AND MOUNTING ARRANGEMENTS THEREFOR

CROSS REFERENCE TO RELATED APPLICATION

Commonly owned, concurrently filed application entitled "SWITCHGEAR CONDUCTORS AND MOUNTING ARRANGEMENTS THEREFOR" and identified by attorney docket no. 98-PDA-234.

BACKGROUND OF THE INVENTION

1. Field of the Invention

This invention relates to switchgear for electric power distribution systems. More particularly, it relates to the construction and support of the rigid electrical conductors forming buses which route the power within the switchgear cabinet, and especially to the vertical buses or risers which distribute power to multiple electrical apparatus stacked in the switchgear cabinet.

2. Background Information

Switchgear assemblies are combinations of electrical apparatus for electric power distribution systems mounted in metal cabinets. The electrical apparatus typically includes switching devices such as circuit breakers and network protectors which provide protection as well as switching, disconnect switches which isolate or separate parts of the distribution system, and transfer switches which are used to connect the system to alternative power sources. A switchgear assembly can also include instrumentation such as metering equipment.

Typically, several pieces of electrical apparatus are mounted in a single cabinet, usually stacked vertically. Multi-phase input and output electrical conductors must be connected to each piece of electrical apparatus. In a common arrangement, a set of multi-phase rigid conductors or bus bars extend transversely through the cabinet to form a cross bus. A set of multi-phase risers extending vertically within the cabinet behind the electrical apparatus connects the cross bus conductors with the individual electrical apparatus through stabs which are engaged by quick disconnects on back faces of the electrical apparatus as the apparatus is fully inserted into the cabinet. Another set of rigid conductors, called runbacks, engage other quick disconnects on the electrical apparatus and extend rearward between the risers for connection to cabling extending out of the cabinet.

Historically, the vertical bus assemblies or risers in switchgear have utilized flat copper conductors. Currently, there is a riser configuration which utilizes two U-shaped conductors mounted back to back to form an H configuration. This geometry with its increased section modulus, provides a more rigid bus which exhibits improved performance against the magnetic forces incurred during short circuit conditions. For higher ampere ratings, additional thick flat bars are added along one or both sides of the H. These combinations of conductors utilized to achieve various current ratings are not the most efficient constructions. The "skin" effect phenomena (ratio of ac to dc resistance) in conductors dictates that the bulk of the ac current flows in the outer perimeter of a current path. In effect, material internal to the outer perimeter of a current path is significantly less efficient than the material on the perimeter. The H shaped construction results in substantial material internal to the perimeter (the cross bar of the H). In addition, the higher rated risers with the additional flat conductors on the outside make the vertical legs of the H internal. Another consideration in the construction of the vertical bus or risers within switchgear is the interface of these buses with the stabs which connect the risers to the individual pieces of electrical apparatus.

There is a need for improvement in switchgear and particularly in the construction and mounting of the vertical bus bars or risers.

There is a particular need for providing an efficient construction of the risers for carrying current which can also resist the high magnetic forces experienced during short circuit conditions.

There is a further need for such improved switchgear risers which can accommodate for various current ratings with minimum modifications and with adequate resistance to the magnetic repulsion forces.

There is still another need for such an improved vertical bus bar arrangement in which the risers can be easily connected to the stabs.

SUMMARY OF THE INVENTION

These needs and others are satisfied by the invention which is directed to switchgear having the risers which distribute current to electrical apparatus vertically stacked in a switchgear cabinet comprising hollow conductors, preferably in the form of a pair of confronting conductors laterally spaced from one another. Preferably, the switchgear also includes stab members and mounting means mounting the stab members to project laterally from the risers in alignment for engagement with the electrical apparatus. Preferably, the stab members comprise a pair of stab elements having spaced apart flat sections straddling both of the confronting conductors of an associated riser and terminal sections joined to form a stab connector. In this arrangement, the mounting means comprises means securing the flat section of each stab element against both conductors of the associated riser.

Preferably the risers comprise a first U channel with a bight and a pair of legs extending from the bight in spaced parallel relation, and a second channel with a bight and a pair of legs extending from the bight in spaced parallel relation, toward the pair of legs of the first channel. The stab elements bear against the outer surfaces of the legs of the two channels. In this arrangement the mounting means comprise backing plates bearing against inner surfaces of the legs of the channels and threaded fastener means extending through the stab elements of the legs and engaging tapped holes in the backing plates. A common backing plate bearing against the inner surface of the legs of the two channels is provided for each of the stab elements. These common backing plates span the gap between the legs of the confronting channels.

To accommodate variations in ampere rating of the risers, the legs of the first channel have a first thickness and the legs of the second channel have a second thickness but a common width between outer surfaces of the two legs of each U channel is maintained. With different thicknesses of the legs of the confronting U channels, the inner surfaces do not lie in a common plane. The common backing plate for each of the stab elements has a first face which bears against the inner surfaces of the legs on the U channels when the second thickness is less than the first thickness and a second, planar face which bears against the inner surfaces of the legs on the U channels when the first and second thicknesses are substantially equal. The first face of the backing plates has a first section with a third thickness which bears against the inner surface of the legs of the first channel and a second section with a fourth thickness which bears against the inner surface the leg of the second channel. The first thickness plus the third thickness is made substantially equal to the second thickness plus the fourth thickness.

Preferably, the common backing plates comprise a planar member with projections on the first surface in the second section which together with the planar member provide the fourth thickness.

The invention is also directed to a riser assembly for switchgear as described above.

BRIEF DESCRIPTION OF THE DRAWINGS

A full understanding of the invention can be gained from the following description of the preferred embodiments when read in conjunction with the accompanying drawings in which:

FIG. 6 is an isometric view of a mounting plate in accordance with the invention.

FIG. 7 is a fragmentary vertical section taken through a riser showing a stab connection for a U channel which is smaller than its mating U channel.

FIG. 8 is similar to FIG. 7 showing a stab connection for a U channel which is equal in thickness to its mating channel.

DESCRIPTION OF THE PREFERRED EMBODIMENTS

Figure 1:
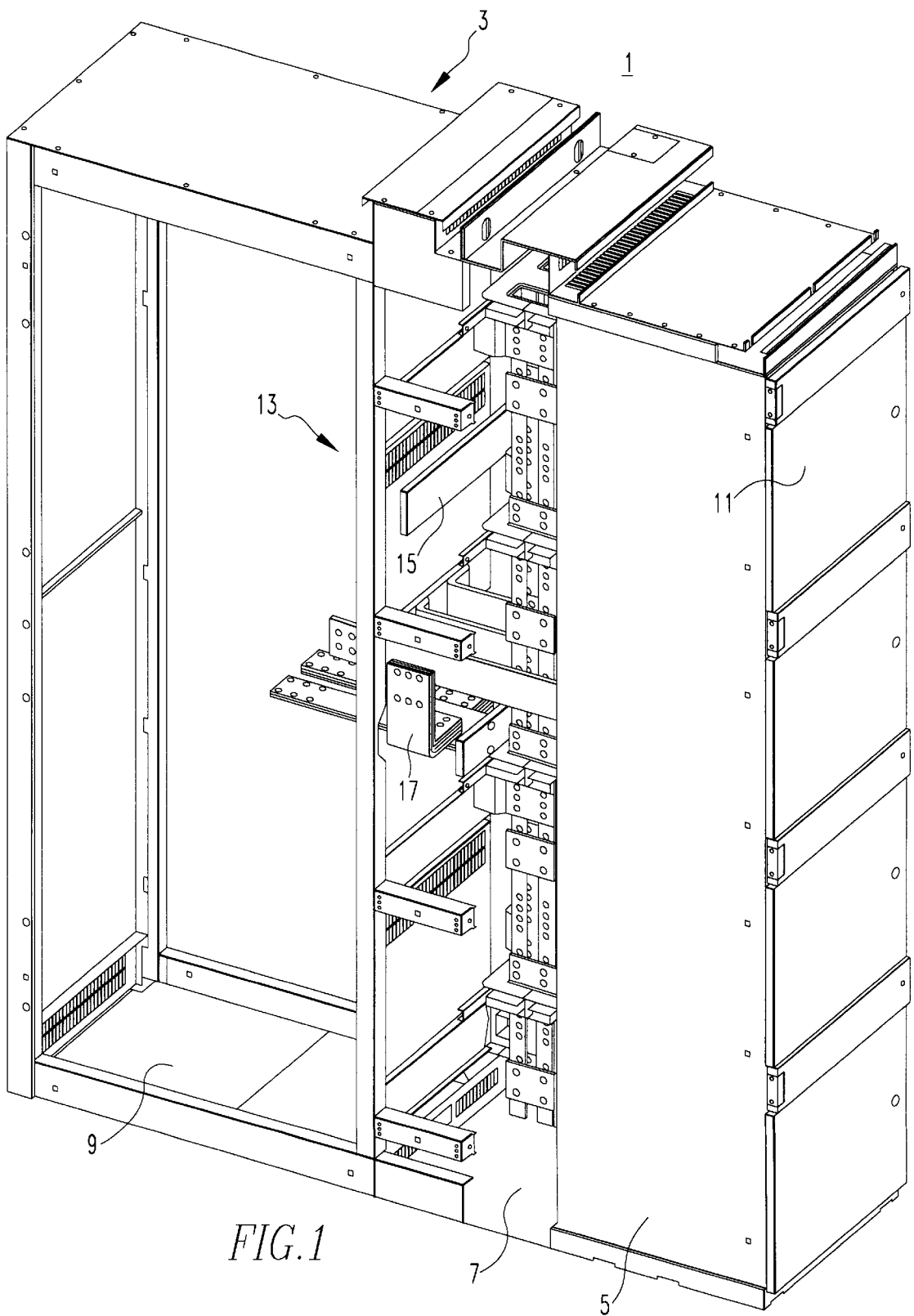
FIG. 1 is an isometric view of a switchgear assembly incorporating the invention.

FIG. 1 illustrates a switchgear assembly 1 incorporating the invention which includes a metal cabinet 3 having a front compartment 5, a middle compartment 7 and a rear compartment 9. The front compartment 5 has a plurality of vertically stacked cells each having a front door 11. Each cell can contain electrical apparatus such as, for instance, a circuit breaker. The middle compartment 7 houses the main cross bus 13 which includes phase conductors 15 (only one shown in FIG. 1) and a neutral conductor 17. The rear compartment 9 houses cabling (not shown). This cabling and the main cross bus 13 connect the switchgear assembly 1 into an electric power distribution system (not shown).

Figure 2:
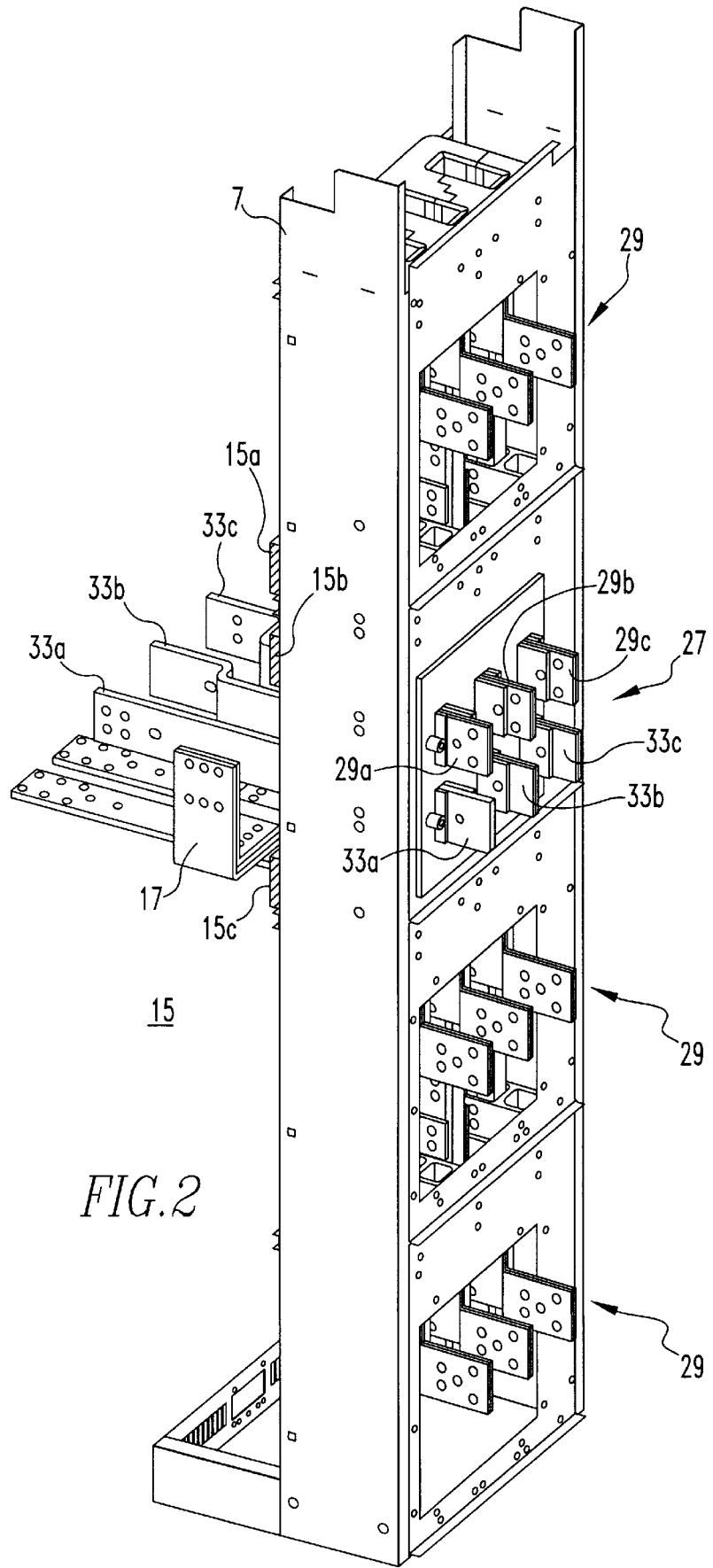
FIG. 2 is an isometric view generally from the front of a middle compartment of the switchgear assembly of FIG. 1 with some parts removed.
Figure 3:
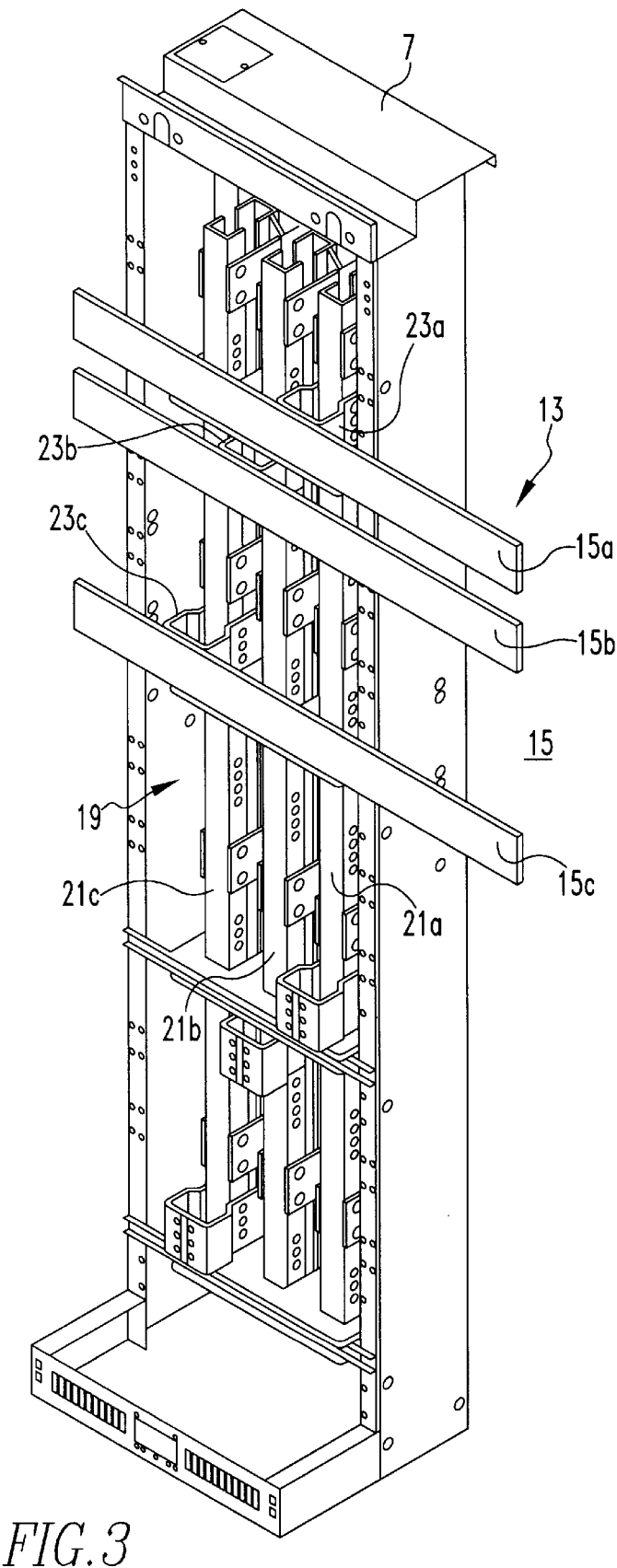
FIG. 3 is an isometric rear view of the middle compartment of the switchgear with some parts removed.

FIGS. 2 and 3 illustrate in more detail the arrangement of buses within the middle compartment 7. The main cross bus 13 includes vertically spaced horizontally extending phase conductors 15a, 15b and 15c. Also housed in the middle compartment 7 is a vertical bus 19 which includes risers 21a, 21b and 21c which are connected to the associated phase conductor 15 of the main cross bus 13 by main conductor taps 23a, 23b and 23c.

Figures 4, 4A:
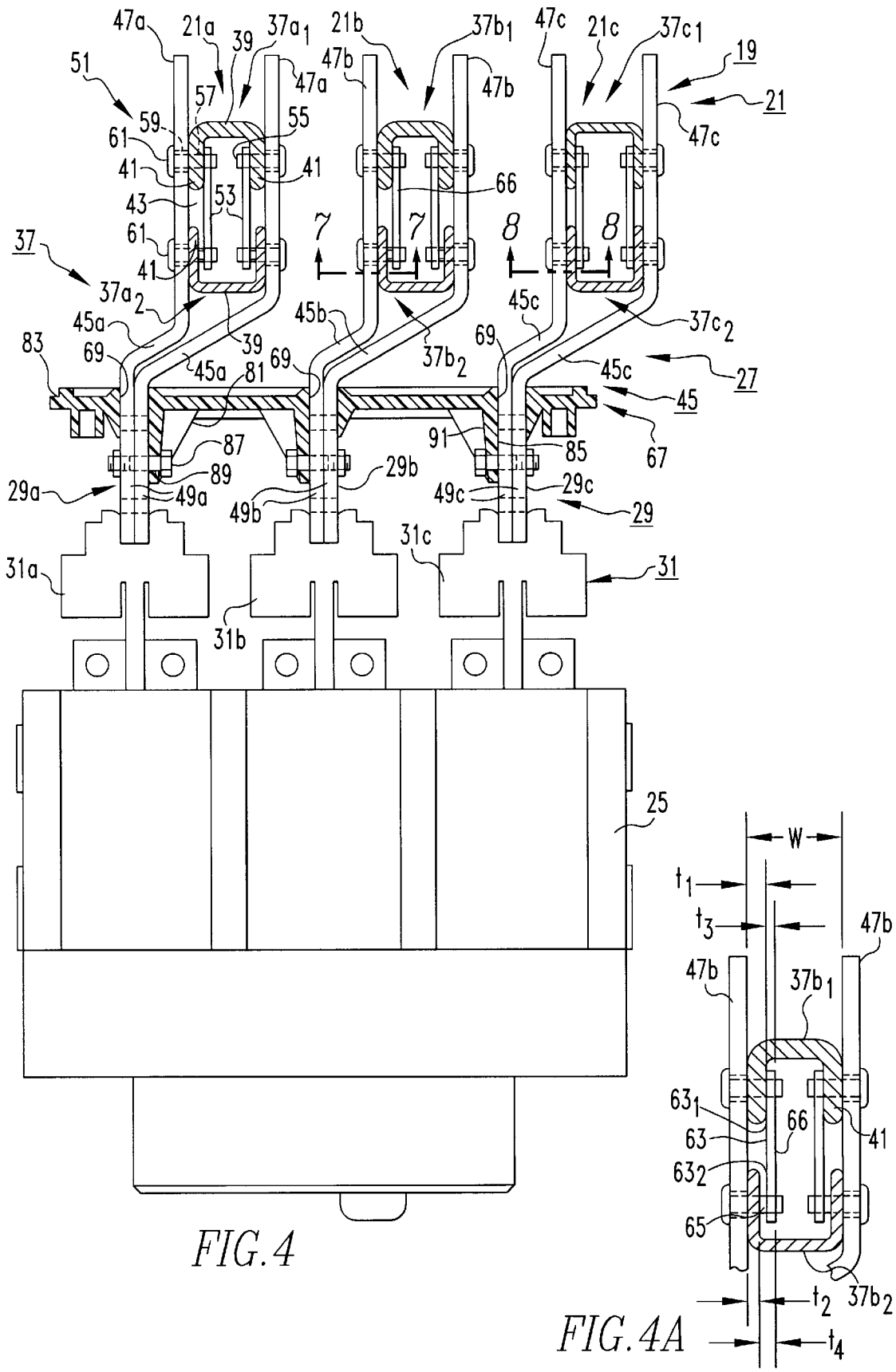
FIG. 4 is a horizontal sectional view through the bus bars in the middle compartment of the switchgear generally at the level of stabs and illustrating their connection to an electrical apparatus forming part of the switchgear.
FIG. 4A is an enlargement of a portion of FIG. 4.
Figure 5:
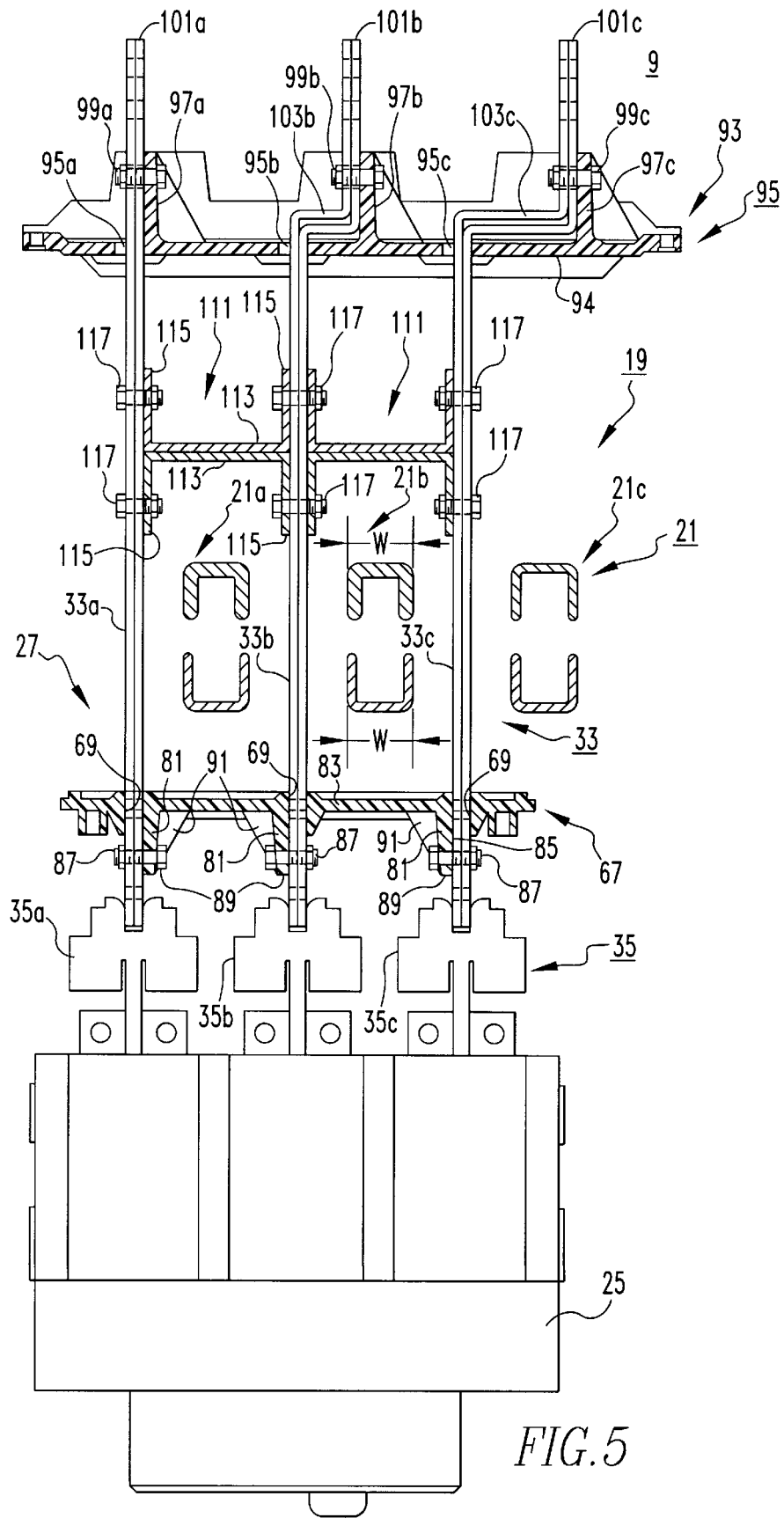
FIG. 5 is a horizontal section view similar to FIG. 4 but at a level just above the runback connections.

As mentioned with respect to FIG. 1, the front compartment 5 of the switchgear cabinet 3 contains electrical apparatus stacked vertically. This electrical apparatus, such as circuit breakers, must be connected to the bus systems. Thus, as shown in FIGS. 2, 4 and 5, the electrical apparatus 25 is connected to the bus systems by interface conductors 27. These interface conductors 27 include stab conductors 29a, 29b and 29c which connect the risers 21a, 21b and 21c to the electrical apparatus 25 through quick disconnects 31a, 31b and 31c. The other side of the electrical apparatus 25 is connected to interface conductors 27 in the form of runbacks 33a, 33b and 33c through another set of quick disconnects 35a, 35b and 35c. As shown in FIG. 5, the runbacks 33 pass between the risers 21 and extend into the rear compartment 9 where they are connected to cabling (not shown).

Each of the risers 21 is a hollow conductor which is a more efficient conductor of AC current than a solid flat conductor or the H conductors of the prior art as they concentrate the conductive material at the periphery where the current is concentrated as a result of the skin effect. The hollow conductors 21 are formed by a pair of confronting electrically conductive U channels $37a_1$–$37c_2$ as shown in FIG. 4. Each of the channels includes a bight 39 and a pair of parallel legs of 41 extending from opposite ends of the bight. The pairs of U channels 37 are mounted in spaced confronting relationship with the legs of the two U channels 37 of each pair extending toward each other. Preferably, the confronting channels 37 of each pair are laterally spaced from each other by a gap 43. This allows convective circulation of cooling air through the hollow risers 21 thereby lowering the temperature rise for a given ampere rating. The paired U channels 37 of each of the risers 21 are fixed in spaced relation by supports in the form of the main bus taps 23a–23c (as shown in FIG. 3) and the stab conductors 29a–29c.

As also seen in FIG. 4, the stab conductors 29a–29c each comprise a pair of flat stab conductor elements 45a–45c. These stab elements 45 have flat sections 47a–47c straddling the pair of U channels 37 of the associated riser 21, and terminal sections 49a–49c extending generally laterally from the U channels 37 and joined together to engage the associated quick disconnect 31. The flat sections 47 of the stab conductors 29 are secured to the associated pair of U channels by stab mounts 51. These mounts 51 include backing plates 53 (see FIG. 6) having two sets of apertures 55 aligned with apertures 57 in the legs of the risers and apertures 59 through the flat sections 47 of the stab conductors 29. The mounts 51 further include bolts 61 which extend through the apertures 59 and 57 and engage the tapped apertures 55 in the backing plates to clamp the legs 41 of the U channels 37 between the backing plates and the stab conductor elements 45. This arrangement solves the problem of securing the stab conductors 29 to the confronting U channels 37 of the risers 21. While a nut could easily be applied to a bolt in one of the U channels, access to the inside of the confronting channel is then very limited. The backing plates 53 with the tapped holes 55 being common to both channels of each riser make assembly of the hollow risers 21 much simpler.

The low voltage switchgear (up through 600 volts) for which this invention is particularly suitable, is typically provided with a range of current ratings such as, for example, 2,000, 3,200, 4,000 and 5,000 amperes. The risers 21 must provide the appropriate conductor cross section to meet temperature limitations for each of these current ratings. The hollow conductor arrangement is particularly suitable for making this accommodation. In particular, the thickness t of the sheet material which is roll formed into the U channels 37 is selected to provide the appropriate conductor cross section. In order to standardize supports and other dimensions within the switchgear, all of the U channels 37 are formed with a common width w between the outer surfaces of the legs 41. With this dimension of the U channels fixed, it is possible to use different thicknesses for the two U channels 37 in a confronting pair to accommodate a particular current rating. In order to make a solid connection between the risers and the stab conductors 29, the backing plates 53 are configured to accommodate for this variation in thickness of the U channel legs. Thus, where the legs 41 of the confronting pair of U channels 37 have thicknesses $t_1$ and $t_2$, the backing plate 53 has a first face 63 with a first section 63, having a thickness $t_3$ determined by the thickness of the sheet material from which the backing plate is fabricated (see FIGS. 4A, 7 and 8). The thickness $t_4$ of the second section $63_2$ is provided by projections 65. Advantageously, the backing plates 53 can be inexpensively made by a stamping process which punches the mounting holes 55 through the plate, and forms the projections 65 by partial penetration of the plate. The second face 67 of the backing plate 53 is planar. When the thicknesses $t_1$ and $t_2$ of the confronting legs of the pair of U channels 37 are different, the backing plate is mounted with the first face 63 bearing against the inner faces of the channel legs 41 with the second section $63_2$ with the projection 65 bearing against the thinner U channel leg as shown in FIGS. 4A and 7. By making the thicknesses $t_1$ plus $t_3$ equal to $t_2$ plus $t_4$, the backing plate 53 will seat firmly inside the two different thickness U channels. When the same size U channels are used for a confronting pair in a riser, the backing plate 53 is turned over so that the second, planar face 66 bears against the inside of the channel legs 41 as shown in FIG. 8. By standardizing the variation in thickness of the material used for the U channels, the backing plates 53 can be used with any two consecutive thicknesses of U channels.

By reference again to FIGS. 4 and 5, the interface conductor 27, which include the stab conductors 29 and runbacks 33 which engage each circuit breaker, are supported by a first or forward support member 67. This forward support is an electrically insulated panel which also serves as a barrier between the front compartment 5 and middle compartment 7 of FIG. 1. The forward support has slots or openings 69 through which the stab conductors 29 and runbacks 33 extend for engagement with the quick disconnects 31 and 35 on the electrical apparatus 25.

Figure 9:
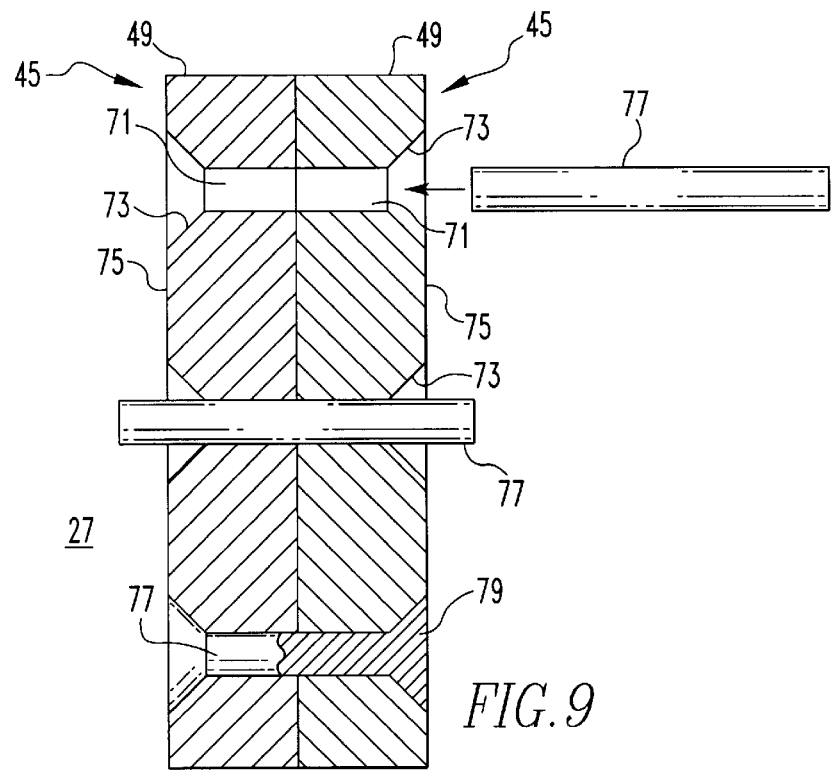
FIG. 9 is a section through an interface conductor forming part of the invention showing the steps of assembly.

As previously described in connection with FIG. 4, each stab comprises a pair of flat stab conductor elements 45a 45c having terminal sections 49a–49c respectively which are engaged by the quick disconnects 31a–31c respectively. These flat terminal sections 49 must be firmly secured together so that the pair of thin strips act as a beam. The terminal sections must be joined together so that there are no protrusions which would interfere with the engagement with the disconnects 31. Also, these terminal sections are passed through the slots 69 in a front support 67 from the rear, so that again there can be no protrusions which would interfere with this snug fit with the front support 67 which prevents arcs from propagating between compartments and provides stability for the conductors. As shown in FIG. 9, the pair of elongated flat members 49 forming an interface conductor 27 are stacked flat against each other. Aligned apertures 71 extend through the flat conductors and have recesses, preferably in the form of beveled countersinks 73 at outer surfaces 75 of the flat conductors 49. An elongated fastener 77 is inserted through the aligned apertures 71 and has enlarged ends 79 which are fully seated in the recesses 73. Preferably, the fastener 77 is a piece of soft copper round stock which is initially greater in length than the combined thickness of the conductors 49. The two ends of the fastener 77 are mechanically pressed so that the material in the extra length of the round stock fills the countersinks 73 and the fastener 77 becomes a double-side rivet. Thus, the pair of flat conductors are securely fastened together to become a beam, but without any protrusions so that they can snugly fit through the openings 69 in the forward support 67 of FIG. 4.

Figure 10A:
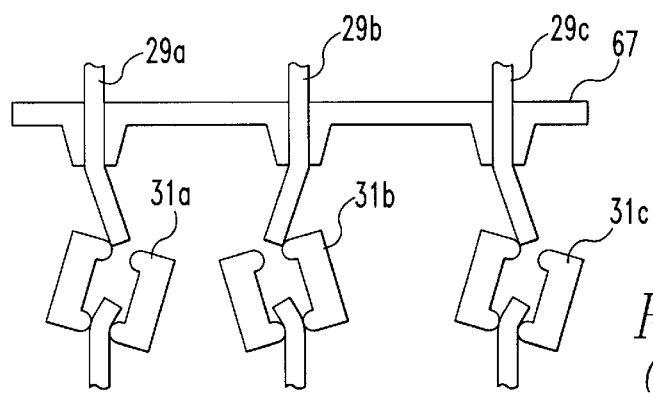
FIG. 10A illustrates a forward support arrangement for interface conductors as provided by the prior art showing the effects of a short circuit.

It has been found that when the interface conductors are cantilevered forward an extended distance from the front support 67 that the sizable magnetic forces generated by short circuits can result in bending of the interface conductors such as the stabs 29a–29c as shown in FIG. 10A. This produces a poor connection with the quick disconnects 31a–31c respectively and can even result in a disconnect.

Figure 10B:
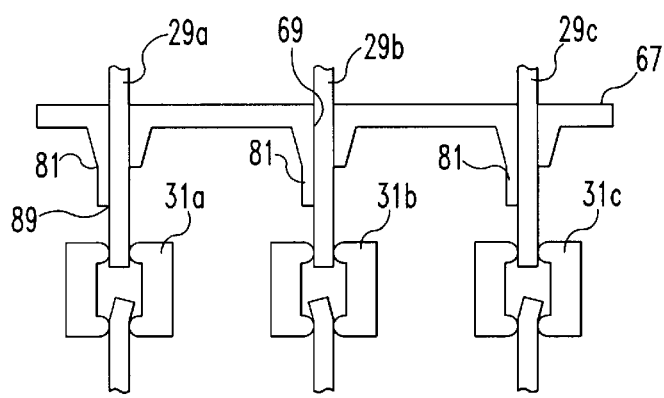
FIG. 10B illustrates our forward interface conductor support arrangement, showing its resistance to distortion due to a short circuit.

In accordance with another aspect of the invention, the front support 67 is provided with integrally formed rigid extensions 81 projecting forward from the base panel member 83 toward the quick disconnects along side the openings 69 as shown particularly in FIG. 4. These rigid extensions 81 have planar surfaces 85 against which the interface conductors 27 such as the runbacks 33 are firmly seated by fasteners 87 near the free end 89 of the rigid extensions. The rigid extensions 81 are stiffened by integral braces 91. The added support given to the interface conductor 27 by the rigid extensions 81 on the forward support 67 reduce the tendency of these conductors to bend under short circuit conditions as shown in FIG. 10B.

As is shown in FIG. 5, the runbacks 33, which form the other interface conductors 27 in addition to the stabs 29, are also fabricated from a stacked pair of flat conductors which are similarly secured together, particularly at the forward end where they engage the disconnects 31, by fasteners with enlarged heads which are seated within countersinks in apertures through the flat conductors. Thus, the runbacks 33 are also inserted from the rear through the snug fitting slots 69 in a forward support 67.

Figure 11:
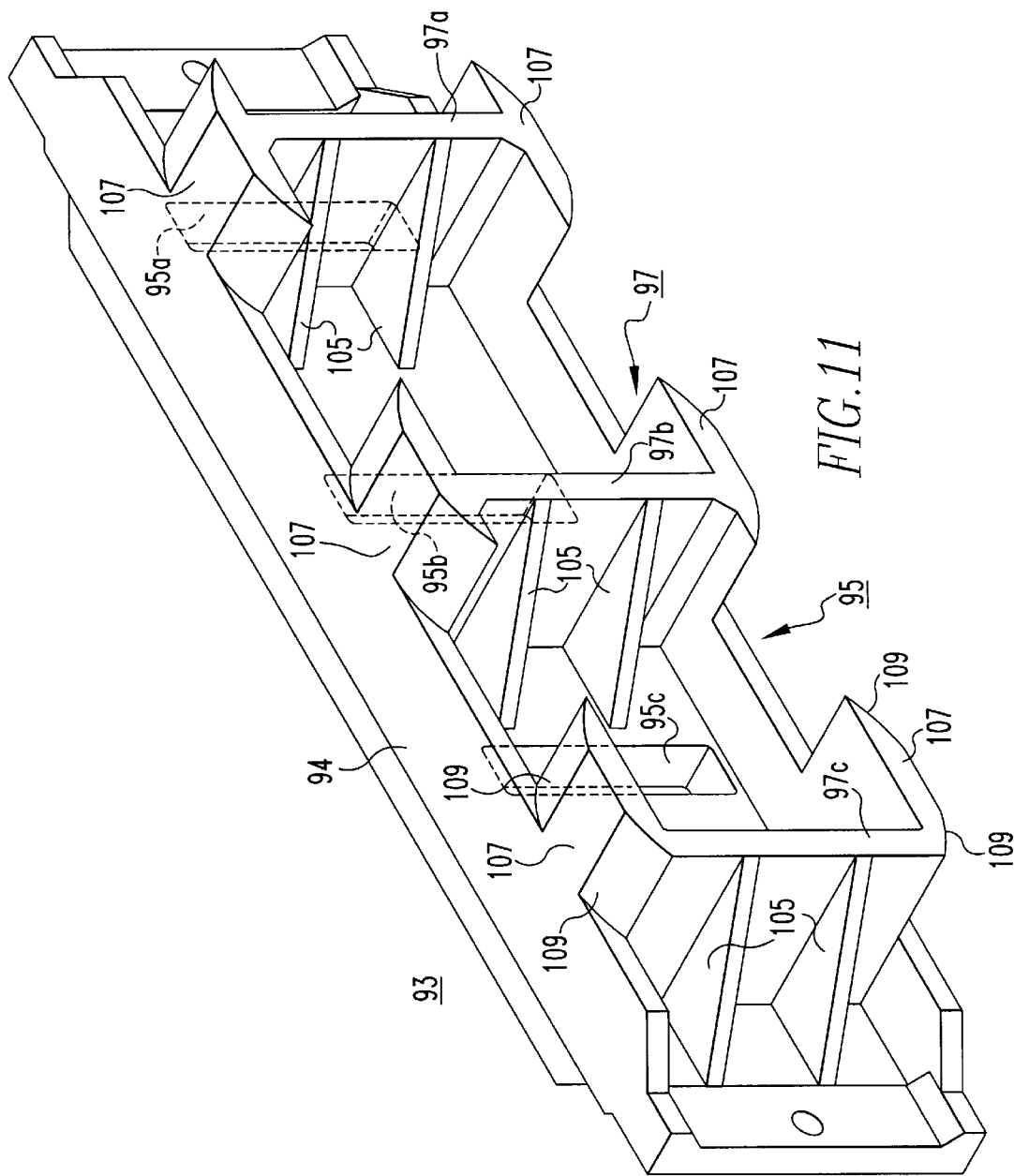
FIG. 11 is a rear isometric view of our rear runback support.

The runbacks 33 extend rearward between the risers 21 of the vertical bus 19 and into the rear compartment 9 where they are connected to cabling (not shown). The runbacks 33 are supported adjacent to the interface between the middle compartment 7 and the rear compartment 9 by a second or rear support 93 as shown in FIG. 5. Referring also to FIG. 11, this rear support 93 has a molded base 94 with slots 95 through which the conductors 33 extend. In order to provide greater lateral spacing between the runbacks in the rear compartment, the runback 33a extends straight through the rear support. An integrally molded support flange 97a extends rearward alongside the slot 95a into which the runback 33a is secured by a fastener 99a. A second integrally molded flange 97b is offset laterally from the slot 95b. The rearward end 101b of the runback 33b is offset laterally from the remainder of the runback by a transverse section 103b so that the end section seats against and is supported by the flange 97b to which it is secured by fastener 99b. The runback 33c has a transverse section 103c which offsets the rear end 101c from the opening or slot 95c. The end 101c is secured by fasteners 99c to the integrally molded support flange 97c which itself is offset laterally from the opening or slot 95c. The transverse section 103c is twice as long as the transverse section 103b so that equal increased spacing is provided between the 3 runbacks. In the transverse sections, the pair of conductors are spaced apart to permit alignment of rivits located in front in case of bend error. Other arrangements to increase the lateral spacing between the runback and the rear compartment 9 are possible. For instance, the center runback 33b could go straight through the rear support 93 with the 2 outer runbacks 33a and 33c having oppositely outwardly directed transverse sections.

As shown in FIG. 11, the rear support 93 has integrally formed braces 105 providing stiffening for each of the support flanges 97. It also has upper and lower horizontal extensions 107 on the support flanges 97 which are rounded at the corners 109 to provide supports for toroidal current transformers (not shown) through which the runbacks extend. Similar supports (not shown) for toroidal current transformers can be molded on the rigid extensions of the forward support 67.

In addition to the front supports 67 and rear supports 93, phase-to-phase supports 111 are provided between the runbacks 33 between the risers 21 and the second or rear support 93 as shown in FIG. 5. These phase-to-phase supports 111 comprise a spacer 113 extending between adjacent runbacks 33 and flanges 115 on each end of the spacers bearing against and secured to the runbacks by fasteners 117. In the exemplary embodiment of this aspect of the invention, these phase-to-phase supports 111 are C channel members having a web forming the spacer 113 and with the flanges 115 extending from the ends of the web. Preferably, pairs of the C channels are mounted back to back. Alternatively, I channels can be used. These phase-to-phase supports are preferably molded of an electrically insulative resin.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Switchgear comprising:
   a cabinet;
   at least one electrical apparatus mounted in said cabinet;
   a set of risers vertically mounted in said cabinet and each comprising a pair of confronting electrically conductive U-channels;
   stab members; and
   mounting means mounting said stab members to project laterally from at least some of said risers in alignment for engagement with said at least one electrical apparatus to electrically connect said at least one electrical apparatus to at least some risers.

2. The switchgear of claim 1 wherein said confronting U-channels of each riser are laterally spaced from each other.

3. The switchgear of claim 1 wherein said stab members each comprise a pair of stab elements having spaced apart flat sections straddling both U-channels of an associated riser and terminal sections joined to form a stab connector for said at least one electrical apparatus, and said mounting means comprises means securing said flat section of each stab element against both U-channels of the associated riser.

4. The switchgear of claim 3 wherein said pair of U-channels in said associated riser comprises a first channel with a bight and a pair of legs extending from said bight in spaced parallel relation, and a second channel with a bight and a pair of legs extending from said bight in spaced parallel relationship toward said pair of legs of said first channel, said stab elements bearing against said outer surfaces of said legs of said first channel and said second channel, and wherein said mounting means comprises backing plates bearing against inner surfaces of said legs of said first and second channels and threaded fastener means extending through said stab elements and legs of said first and second channels and engaging tapped holes in said backing plates.

5. The switchgear of claim 4 wherein each said backing plate has the same cross sectional dimensions.

6. The switchgear of claim 5 wherein said first and second U-channels of said risers are horizontally spaced by a gap, and said backing plates span said gap between said legs of said first and second channels.

7. The switchgear of claim 5 wherein said legs of said first channel have a first thickness, the legs of said second channel have a second thickness and wherein said backing plate for each of said stab elements has a first face which bears against said inner surfaces of said legs on said U-channels when said second thickness is less than said first thickness and a second, planar face which bears against said inner surfaces of said legs on said U-channels when said first and second thicknesses are substantially equal, said first face of said backing plates having a first section with a third thickness which bears against said inner surface of said legs of said first channel and a second section with a fourth thickness which bears against said inner surface of said leg of said second channel, said first thickness plus said third thickness being substantially equal to said second thickness plus said fourth thickness.

8. The switchgear of claim 7 wherein said backing plates comprise a planar member with projections on a first surface in said second section, which with said planar member, provide said fourth thickness.

9. A riser assembly for switchgear comprising:
   a pair of electrically conductive, elongated U-channels each comprising a bight and a pair of legs extending from said bight in spaced, substantially parallel relationship;
   support means supporting said pair of U-channels in confronting parallel relationship with said legs of each U-channel extending toward said legs of the other U-channel; and
   wherein said support means comprises a stab member joining said pair of U-channels and extending generally laterally of said U-channels.

10. The riser assembly of claim 9 wherein said support means further comprises main bus taps joining said pair of U-channels and extending generally laterally of said U-channels.

11. The riser assembly of claim 9 wherein said stab member comprises a pair of stab elements each having a flat section straddling said pair of U-channels and terminal sections extending generally laterally from said U-channels and joined to form a stab connector, and said support means further includes mounting means mounting each of said flat sections of said stab elements flat against confronting legs of said pair of U-channels.

12. The riser assembly of claim 11 wherein said mounting means comprises a pair of backing plates with threaded apertures each bearing against inner surfaces of said confronting legs of said U-channels and fasteners extending through said stab elements and legs of said U-channels and engaging said threaded apertures in said backing plates.

13. The riser assembly of claim 11 wherein said legs of a first of said U-channels have a first thickness and said legs of a second of said U-channels have a second thickness but said first and second U-channels have a common width between outer surfaces of said legs, and said backing plates have a first face which bears against inner surfaces of said confronting legs on said U-channels when said second thickness is less than said first thickness, and a second, planar face which bears against said inner surfaces of said confronting legs on said U-channels when said first and second thicknesses are substantially equal, said first face of said backing plates having a first section with a third thickness which bears against said inner surface of said leg of said first channel and a second section with a fourth thickness which bears against said inner surface of said leg of said second channel, said first thickness plus said third thickness being substantially equal to said second thickness plus said fourth thickness.

14. The riser assembly of claim 13 wherein said backing plates are planar members with at least one projection on said second section of said first surface having a thickness which with said planar member provides said fourth thickness.

15. The riser assembly of claim 14 wherein said backing plates are of a length which laterally spaces said first channel from said second channel.

16. A riser assembly for switchgear comprising:

a pair of electrically conductive, elongated U-channels each comprising a bight and a pair of legs extending from said bight in spaced, substantially parallel relationship;

support means supporting said pair of U-channels in confronting parallel relationship with said legs of each U-channel extending toward said legs of the other U-channel; and wherein said support means comprises main bus taps joining said pair of U-channels and extending generally laterally of said U-channels.

* * * * *